US006456428B1

(12) United States Patent
Nakaji et al.

(10) Patent No.: US 6,456,428 B1
(45) Date of Patent: Sep. 24, 2002

(54) OPTICAL AMPLIFIER (75) Inventors: Haruo Nakaji; Motoki Kakui, both of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/653,952

(22) Filed: Sep. 1, 2000

(30) Foreign Application Priority Data

Sep. 2, 1999 (JP) ............................................ 11-248944

(51) Int. Cl.[7] ................................................ H01S 3/00
(52) U.S. Cl. ................................................ 359/341.41
(58) Field of Search ........................ 359/337.2, 337.21, 359/341.41, 341.42, 337

(56) References Cited

U.S. PATENT DOCUMENTS

| | | | | |
|---|---|---|---|---|
| 5,283,686 A | * | 2/1994 | Huber | 359/337 |
| 5,541,766 A | * | 7/1996 | Mizrahi et al. | 359/337 |
| 5,557,442 A | * | 9/1996 | Huber | 359/179 |
| 5,812,712 A | * | 9/1998 | Pan | 385/37 |
| 6,049,413 A | * | 4/2000 | Taylor et al. | 359/337 |
| 6,160,658 A | * | 12/2000 | Ishikawa | 359/337 |

FOREIGN PATENT DOCUMENTS

JP     2778438     5/1998     ............ H04B/10/17

OTHER PUBLICATIONS

"Flattened Pass–Band Filter of Double Cascaded Mach–Zehnder Interferometers," by Oguma et al., NTT Photonics Laboratories, p. 202 (with English abstract).

"Reference Level Free Multichannel Gain Equalization and Transient Gain Suppression of EDFA with Differential ASE Power Monitoring," by Yoon et al., IEEE Photonics Technology Letters, vol. 11, No. 3 (Mar. 1999), pp. 316–318.

"Gain Equalization of EDFA's with Bragg Gratings," by Rochette et al., IEEE Photonics Technology Letters, vol. 11, No. 5 (May 1999), pp. 536–538.

"Dynamic Power–Equalized EDFA Module Based on Strain Tunable Fiber Bragg Gratings," by Liaw et al., IEEE Photonics Technology Letters, vol. 11, No. 7 (Jul. 1999), pp. 797–798.

"What is Interlever?" by Jeff Xuan Huang, E–Tek Dynamics (Oct. 1999).

* cited by examiner

Primary Examiner—Thomas H. Tarcza
Assistant Examiner—Deandra Hughes
(74) Attorney, Agent, or Firm—McDermott, Will & Emery

(57) ABSTRACT

The present invention relates to an optical amplifier comprising a structure which prevents transmission quality from lowering and enables constant gain control with a higher speed and higher accuracy. In a typical embodiment of the present invention, amplified light from an EDF is once guided to an optical filter by way of an optical circulator. Of thus guided amplified light, noise light passes through the optical filter, whereas each of signal components is reflected thereby, so as to separate the noise light and signal components from each other. The noise light having passed through the optical filter is detected by a photodetector, and gain control is carried out by a gain control circuit so as to suppress fluctuations in the detected noise light power.

9 Claims, 11 Drawing Sheets

OPTICAL AMPLIFIER

BACKGROUND OF THE INVENTION

1. Field of the Invention

The present invention relates to an optical amplifier for collectively amplifying signal levels in a predetermined wavelength band.

2. Related Background Art

Due to social needs with the advent of advanced information society, research and development have been booming concerning large-capacity, high-speed optical communications and long-haul optical communications utilizing optical fiber transmission line networks. Here, wavelength division multiplexing (WDM) transmission systems are systems which carry out high-speed, large-capacity optical communications by transmitting WDM signals (a plurality of optical signals having different wavelengths) through an optical fiber line, and their development and introduction have been in progress in order to respond to the surge in demands for communications due to Internet and the like.

In such a WDM transmission system, optical amplifiers are typically installed as repeater stations at predetermined intervals in order to compensate for the transmission loss in WDM signals caused by long-haul transmissions. Each optical amplifier comprises an optical amplification section, such as an optical fiber doped with a fluorescent material excitable with pumping light, for amplifying optical signals inputted thereto; and a pumping light source for supplying the pumping light to the optical amplification section. A known example thereof is an erbium-doped fiber amplifier (EDFA).

Also, OXC (Optical Cross Connect) and OADM (Optical Add/Drop Multiplexer) are often employed in WDM transmission systems for their efficient operation and improved reliability. In recent years, in particular, research on large-capacity signal switching and acceleration in switching speed has been under way concerning such OXC, ODAM, and the like along with the increase in transmission capacity.

When an optical amplifier is employed in a transmission system equipped with optical devices having a signal switching function, such as the above-mentioned OXC and OADM, there is a possibility that a problem such as one that follows may occur. Namely, it is important for the optical amplifier to amplify WDM signals in a bundle with a constant gain (amplification factor). If the optical signals are partly switched at a high speed, so that the number of optical signals (number of channels) fed into the optical amplifier is changed abruptly, then transient gain fluctuations may be generated in the optical amplifier due to cross saturation. With respect to such a problem, it has been proposed to speed up an automatic gain control scheme for suppressing the gain fluctuation in the optical amplifier.

For example, as for the gain control in the optical amplifier, gain control techniques utilizing a part of noise light outputted from the optical amplification section that is called ASE (Amplified Spontaneous Emission) are described in Japanese Patent No. 2778438 (document 1) and H. Yoon et al., IEEE Photon. Technol. Lett., vol. 11. no. 3, pp. 316–318, 1999 (document 2).

SUMMARY OF THE INVENTION

The inventors have studied the above-mentioned conventional techniques and, as a result, have found problems as follows. Namely, the optical amplifiers shown in the above-mentioned documents 1 and 2 have been problematic in that the power proportion of the component utilized for automatic power control (APC) in the noise light included in the amplified light outputted from the optical amplifier cannot fully be secured in terms of structure.

For example, a part of noise light tapped by an optical coupler is utilized as monitor light in the optical amplifier shown in document 1, whereas a part of noise light tapped by an arrayed waveguide grating (AWG) is utilized as monitor light in the optical amplifier shown in document 2, whereby none of the optical amplifiers can fully enhance the noise light power to be detected.

Conversely, it means that a considerable amount of noise light not utilized as monitor light is included in the amplified light outputted to the outside (fiber transmission line) from the optical amplifier. Thus, the conventional optical amplifiers have been problematic in that they lack a structure for fully eliminating noise light, thus degrading the noise characteristics, thereby failing to yield a sufficient transmission quality.

In order to overcome problems such as those mentioned above, it is an object of the present invention to provide an optical amplifier which carries out automatic gain control by automatic power control utilizing noise light, and comprises a structure for enhancing the noise light power utilized for the automatic power control, thereby effectively preventing its transmission quality from degrating, and realizing control for constantly maintaining the amplification gain for each optical signal (constant gain control) with a higher speed and a higher accuracy.

For achieving the above-mentioned object, the optical amplifier according to the present invention comprises, at least, an optical amplification section such as an optical fiber doped with a rare earth element or the like, an optical circulator, an optical filter, a photodetector device, and a gain control system, wherein noise light separated from amplified light outputted from the optical amplification section is guided to a branch line different from a main transmission line through which amplified optical signals propagate, and then the noise light is utilized for constant gain control of the optical amplification section.

Specifically, the optical amplification section is an optical component for amplifying optical signals inputted together with pumping light, and includes, for example, an amplification optical fiber doped with a rare earth element such as Er. The pumping light source is an optical component such as LD (Laser Diode), and supplies pumping light to the optical amplification section. The optical circulator is an optical component for separating the noise light from the amplified light outputted from the optical amplification section, and has a first port for inputting the amplified light including the amplified optical signals and the noise light, a second port for outputting the amplified light from the first port to the branch line, and a third port for outputting, of the amplified light, the optical signals re-inputted by way of the second port toward the outside of the optical amplifier (toward the main transmission line). The optical filter is an optical component disposed on the second port of the optical circulator, passes therethrough the noise light of the amplified light outputted from the second port, and reflects the optical signals of the amplified light toward the second port. The photodetector device is an optical component such as PD (Photo Diode) for detecting the noise light power having passed through the optical filter. The gain control system controls the pumping power by monitoring the noise light power to control the gain in the optical amplification section.

The optical amplifier according to the present invention carries out automatic power control by utilizing most of the ASE noise light separated from the amplified light, thus enabling more efficient automatic gain control of optical amplification. Since most of the noise light is utilized by the above-mentioned configuration, the automatic gain control scheme, specifically, the circuit configuration of a gain control circuit or the like included in the above-mentioned gain control system, can be simplified, and also the automatic gain control can be accelerated. (It is important for the noise light utilized as monitor light to have a higher detection level in order to realize a higher speed in automatic gain control, since it is necessary for the PD to enhance its load resistance if the power of noise light to be detected is low, which inevitably hinders the control for the pumping light source and the like from following fluctuations in amplification gain.)

Further, in the optical amplifier according to the present invention, without part of noise light being tapped from a main transmission line such as an optical fiber transmission line network through which the amplified optical signals are to propagate, the amplified light is once guided by the optical circulator to a branch line different from the main transmission line, and then signal and noise light are separated from each other by use of the optical filter. Thus separated signals are reflected by the optical filter, so as to propagate through the main transmission line again, whereas most of the noise light pass through the optical filter, thereby reaching the photodetector device. Such a configuration enables most of the noise light occurring in the optical amplification section to be utilized for automatic power control. In this case, as the detected noise light power becomes higher, the change in gain of the optical amplification section can be measured with a higher speed and higher accuracy. Therefore, as compared with conventional optical amplifiers utilizing the branched part of noise light, the optical amplifier according to the present invention enables automatic gain control with a higher speed and higher accuracy.

The above-mentioned optical filter is characterized in that reflectivity in the optical filter is set at each wavelength of the amplified optical signals so as to equalize the wavelength dependence of amplification gain (flatten the signal level at each signal wavelength) in the optical amplification section. When the reflectivity in the optical filter is set as such, both of automatic gain control and gain equalization are realized.

The optical amplifier according to the present invention may further comprise an output-side variable optical attenuator, disposed between the third port of the optical circulator and the output end of the optical amplifier, for attenuating the optical signals outputted from the third port. Alternatively, the optical amplifier may further comprise an input-side variable optical attenuator, disposed between its input end and the optical amplification section, for attenuating the optical signals to be inputted to the optical amplification section. Installing a variable optical attenuator on the output side or input side of the optical amplifier as such further enables automatic control of the output level of each optical signal and the like.

Also, the optical amplifier according to the present invention may comprise a structure for changing the reflectivity in the optical filter for each wavelength of the amplified optical signals. This configuration enables gain equalization control following fluctuations in the operating state of the optical amplifier, and the like, thereby further improving the accuracy in automatic gain control. In this case, the optical amplifier further comprises an output control system for regulating the reflectivity in the optical filter and thereby controlling the output level of each optical signal to be outputted. Providing such an output control system enables various gain control methods in which the output control effected by the reflectivity control with respect to the optical filter and the output control by means of the variable optical attenuator.

Preferably, the above-mentioned optical filter includes fiber Bragg gratings each passing therethrough noise light in the amplified light and reflecting the associated amplified optical signals. However, optical filters other than the fiber Bragg gratings can also be used as long as they have similar reflecting functions. Further, the above-mentioned output control system comprises a structure for changing the reflectivity in the optical filter by applying a temperature change or a distortion caused by deformation to one or more predetermined parts of the optical filter.

The optical amplifier according to the present invention may comprise an optical component for dividing a signal wavelength band into local bands at a predetermined frequency interval, and separating the divided local bands into a group including the optical signals and a group including the noise light, in place of the optical circulator and the optical filter disposed on the branch line. This optical element has a first port for inputting the amplified light from the optical amplification section including noise light together with the amplified optical signals, a second port for outputting the amplified optical signals separated from the amplified light inputted by way of the first port, and a third port for outputting the noise light separated from the amplified light inputted by way of the first port. Such a configuration also enables gain control with a high speed and a high accuracy. Preferably, the frequency interval for dividing the signal wavelength band is substantially ½ of the frequency interval of the optical signals inputted to the optical amplification section.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 10A to 10C are charts for explaining the structure and function of the optical component in the EDFA shown in FIG. 9, in which FIG. 10A shows a schematic structure of the optical component, whereas FIGS. 11A to 11C are charts for explaining the operation of dividing WDM signals effected by the optical component in the EDFA shown in FIG. 9, in which FIG. 11A shows the spectrum of the inputted WDM signals, whereas

DESCRIPTION OF THE PREFERRED EMBODIMENTS

In the following, embodiments of the optical amplifier according to the present invention will be explained with reference to FIGS. 1 to 3, 4A to 4C, 5 to 9, and 10A to 11C. In the explanation of the drawings, constituents identical to each other will be referred to with numerals or letters identical to each other without repeating their overlapping descriptions.

Figure 1:
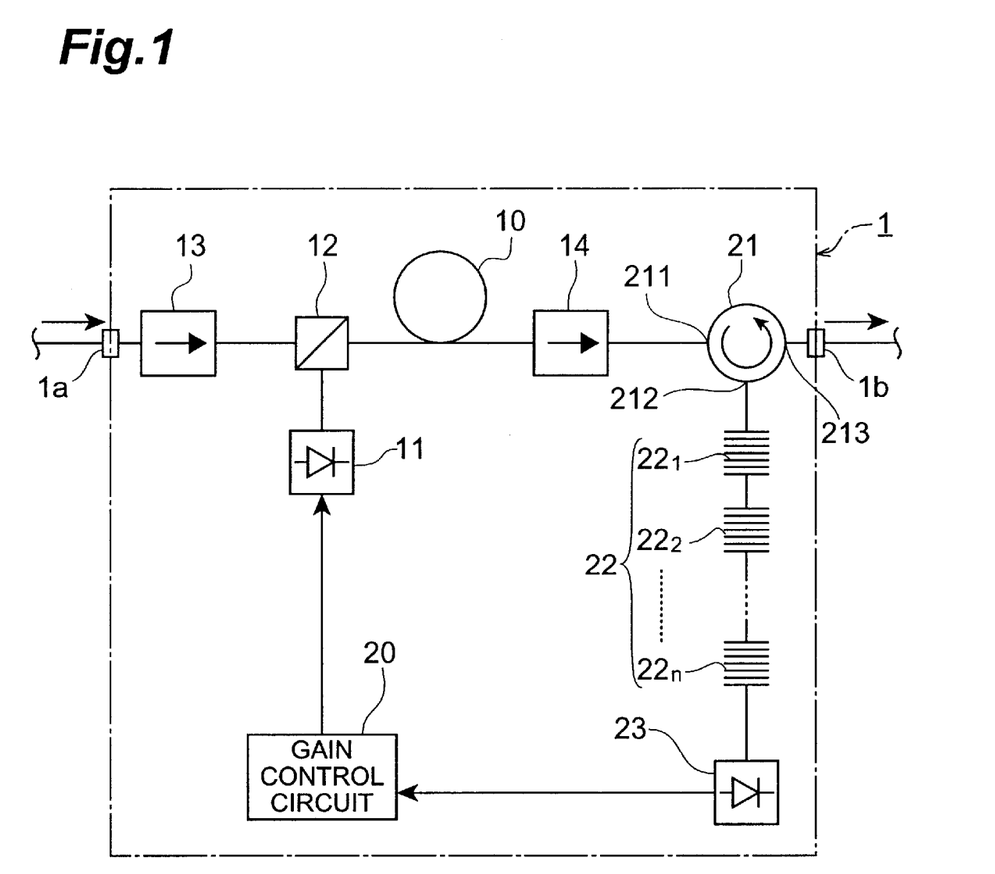
FIG. 1 shows the configuration of an EDFA which is a first embodiment of the optical amplifier according to the present invention.

FIG. 1 shows the configuration of an EDFA (Er-Doped Fiber Amplifier) which is a first embodiment of the optical amplifier according to the present invention. In FIG. 1, the EDFA 1 comprises an input end 1a for receiving optical signals having propagated through a main transmission line such as an optical fiber transmission line, an output end 1b for sending out amplified light to the main transmission line; and also comprises a structure in which an EDF (Erbium-Doped Optical Fiber) 10, a pumping light source 11, a WDM coupler 12, and two optical isolators 13, 14 are arranged between the input end 1a and output end 1b. The EDF 10, which is an optical amplification section of the EDFA 1, is a silica-based optical fiber doped with Er element and functions to amplify optical signals included in a predetermined amplification wavelength band while in a state where a pumping light at the predetermined wavelength.

Each of the optical isolators 13, 14 is an optical component which passes therethrough inputted light forward but not backward. Namely, the optical isolator 13 passes therethrough toward the EDF 10 the light having arrived there from the input end 1a side but does not send out toward the input end 1a the light having once arrived. Also, the optical isolator 14 passes toward the output end 1b the light having arrived there from the EDF 10 but does not send out toward the EDF 10 the light having once arrived.

By way of the WDM coupler 12, the pumping light source 11 is connected to the optical fiber line including the EDF 10, whereby the pumping light is supplied from the pumping light source 11 to the EDF 10. Here, the WDM coupler 12 functions to pass therethrough toward the EDF 10 the pumping light outputted from the pumping light source 11 and pass therethrough toward the EDF 10 the optical signals having arrived there from the optical isolator 13. Thus, the EDFA 1 according to the first embodiment is an optical amplifier having a structure enabling copropagating pumping (forward pumping). As the pumping light source 11 for pumping the EDF 10, a semiconductor laser having a wavelength of 1.48 $\mu$m is employable, for example.

If optical signals are launched by way of the optical isolator 13 into the EDF 10 to which a predetermined wavelength of pumping light is supplied from the pumping light source 11 in the configuration mentioned above, then these optical signals are amplified in the EDF 10. Subsequently, amplified light including the amplified optical signals is outputted from the EDF 10 toward the optical isolator 14. At this time, the amplified light outputted from the EDF 10 includes not only the amplified optical signals but also the noise light (forwardly directed ASE noise light).

The EDFA 1 according to the first embodiment carries out automatic gain control (AGC) of optical amplification by monitoring the ASE noise light power included in the amplified light. For realizing the automatic gain control, the EDFA 1 comprises an optical circulator 21, an optical filter 22, a photodetector 23, and a gain control circuit 20 which is included in a gain control system.

The optical circulator 21 is a three-port optical circulator having three I/O ports consisting of a first port 211 (hereinafter referred to as input port) for inputting the amplified light outputted from the EDF 10, a second port 212 (hereinafter referred to as control port) for receiving the noise light as monitor light to be utilized for the above-mentioned automatic gain control, and a third port 213 (hereinafter referred to as output port) for outputting the amplified optical signals in the amplified light as output light to the outside via the output end 1b.

Here, a general optical circulator is an optical component, having three or more ports, adapted to pass forwardly-advancing light therethrough with a low loss. The three-port optical circulator 21 employed in the EDFA 1 is configured such that the direction indicated by the arrow in FIG. 1 is defined as the forward direction, the light inputted by way of the input port 211 is outputted from the control port 212, and the light inputted by way of the control port 212 is outputted from the output port 213.

The amplified light from the EDF 10 inputted by way of the input port 211 of the optical circulator 21 is outputted by way of the control port 212, so as to be launched into the optical filter 22 on a branch line optically coupled to the control port 212.

The optical filter 22 is an optical component for passing therethrough noise light in amplified light and reflecting the amplified optical signals in the amplified light, and includes n pieces of fiber Bragg gratings $22_1$ to $22_n$ formed in an optical fiber acting as the branch line. The number n of the fiber gratings $22_1$ to $22_n$ corresponds to the total number of channels of the WDM signals fed into the EDFA 1, i.e., the total number of signals in WDM signals.

Here, letting the respective wavelengths of n channels of optical signals as WDM signals be $\lambda_1, \lambda_2, \ldots,$ and $\lambda_n$, the n pieces of fiber gratings $22_1, 22_2, \ldots,$ and $22_n$ reflect wavelengths $\lambda_1, \lambda_2, \ldots,$ and $\lambda_n$ of light, respectively, at a high reflectivity. Namely, the optical filter 22 including the n pieces of fiber gratings $22_1, 22_2, \ldots,$ and $22_n$ reflects all the WDM signals. Of the amplified light outputted from the EDF 10, each signal reflected by the optical filter 22 is taken into the optical circulator 21 again by way of the control port 212, and is outputted as output light to the outside of the EDFA 1 (to an optical fiber line installed between repeater stations) by way of the output port 213 and output end 1b.

Part of amplified light, other than the signals, having passed through the fiber Bragg gratings $22_1, 22_2, \ldots,$ and $22_n$ included in the optical filter 22 without being reflected thereby contains only the ASE noise light generated in the EDF 10. This noise light is detected by the photodetector 23 (photodetector device) such as PD. The photodetector 23 is electrically connected to the gain control circuit 20, whereby the result of detection of noise light power obtained by the photodetector 23 is supplied to the gain control circuit 20.

As long as the amplification gain in the EDF 10 is constant, the power of ASE noise light from the EDF 10 hardly varies even when the signal level (input level) of each optical signal is changed. With respect to noise light having such a property, the gain control circuit 20 (included in the gain control system) carries out power control of the pumping light supplied from the pumping light source 11 to the EDF 10 such that the power of noise light detected by the photodetector 23 becomes substantially constant. As a consequence, the automatic gain control in the EDFA 1 is realized.

While automatic power control (APC) for only the power of noise light is actually performed in the gain control circuit, effects of automatic gain control can be obtained from the above-mentioned relationship between noise light power and amplification gain. Therefore, the method of automatic gain control, specifically, the circuit configuration of the gain control circuit 20 or the like, can be simplified, and the automatic gain control for constantly maintaining the amplification gain can be speeded up. Also, since it is sufficient for the photodetector 23 to measure the power of the whole noise light alone, this configuration can easily respond to optical amplifiers having a wide dynamic range. Further, in the EDFA 1 according to the first embodiment, the power proportion of the noise light utilized for automatic power control is made greater, whereby a higher speed is realized in the automatic gain control.

In the conventional gain control utilizing ASE noise light, only part of noise light branched off from a main transmission line by use of an optical coupler or arrayed waveguide grating is detected as monitor light (see documents 1 and 2). In this case, the power proportion of noise light to be utilized for gain control in the noise light included in the amplified light outputted from the optical amplification section cannot fully be secured.

In the EDFA 1 of the first embodiment, by contrast, the noise light utilized for automatic power control is not branched off on the main transmission line through which optical signals propagate, but the amplified light from the EDF 10 is once outputted to a branch line optically coupled to the control port 212 by use of the optical circulator 21. Then, the optical filter 22 disposed on the branch line reflects only the light in the signal wavelength band (WDM signals) toward the optical circulator 21, whereas the photodetector 23 detects all the noise light having passed through the optical filter 22, whereby automatic gain control of the EDF 10 by automatic power control utilizing noise light is carried out.

In this case, most of the forwardly directed ASE noise light outputted from the EDF 10 can be utilized for gain control, whereby gain can be made constant by automatic gain control with a higher speed and higher accuracy.

Figure 2:
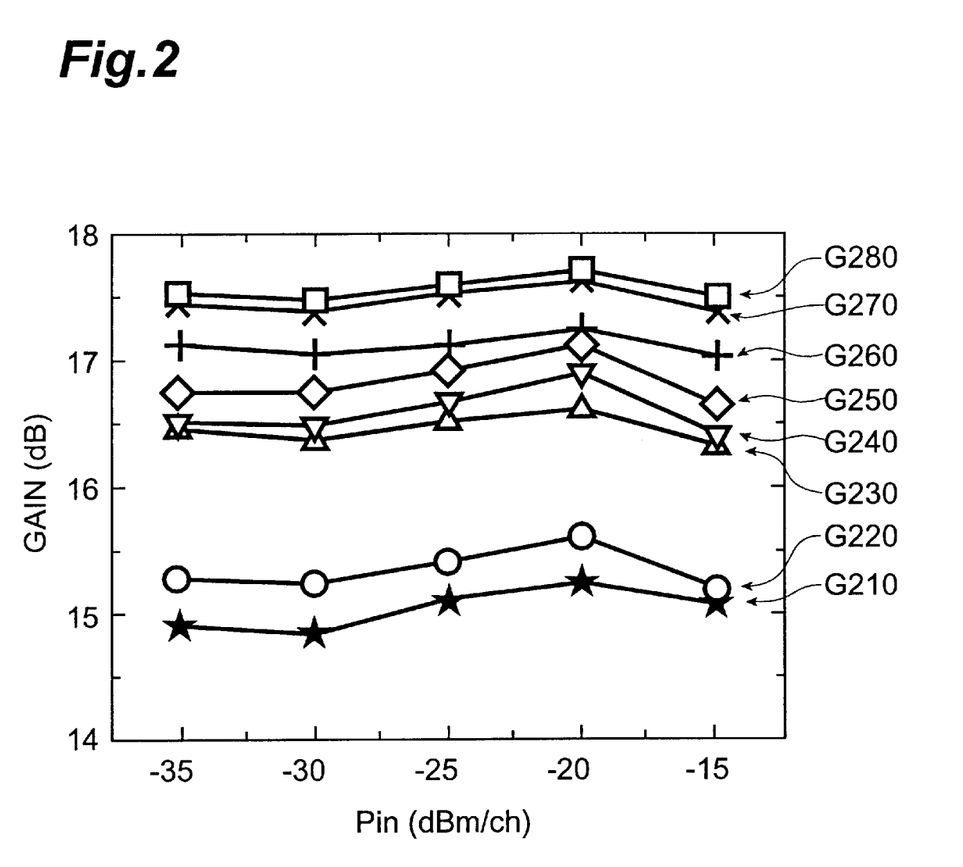
FIG. 2 is a graph showing the input level dependence of the gain obtained by the EDFA shown in FIG. 1.

FIG. 2 is a graph showing the input power level dependence of the gain obtained by the EDFA 1 shown in FIG. 1. Shown in FIG. 2 are results of measurement of gain (ordinate) in 8 ch (channels; corresponding to the number of optical signals) of optical signals having a signal wavelength λ of 1535.78 to 1558.31 nm and a channel spacing Δλ of about 3.2 nm obtained while their input power level $P_{in}$ per channel (abscissa) is changed from −35 dBm/ch to −15 dBm/ch. Here, curves G210, G220, G230, G240, G250, G260, G270, and G280 show gain fluctuations of light at wavelengths of 1535.78 nm, 1539.12 nm, 1542.26 nm, 1545.19 nm, 1548.46 nm, 1551.85 nm, 1555.07 nm, and 1558.31 nm, respectively.

It is seen that the gain fluctuation generated upon an input power level variation of 20 dB is about 0.6 dB at the maximum, whereby constant gain control with a sufficient accuracy is realized.

Figure 3:
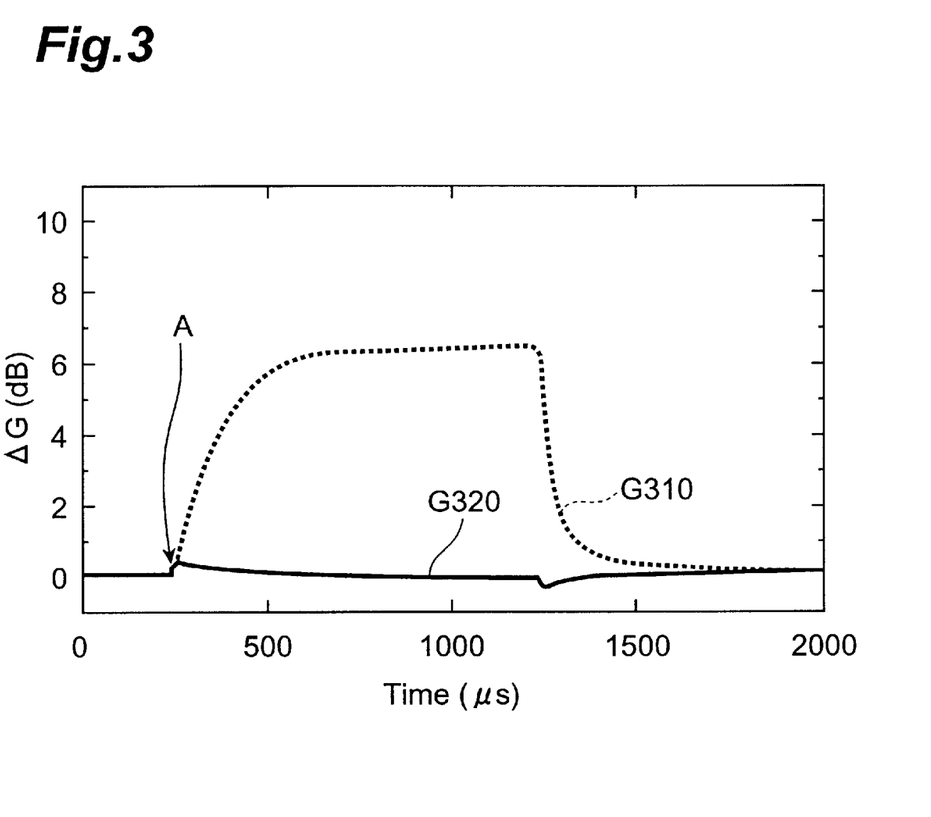
FIG. 3 is a graph showing transient gain fluctuations concerning the EDFA shown in FIG. 1 at the time when the number of signals changes.

FIG. 3 is a graph showing transient gain fluctuations concerning the EDFA 1 shown in FIG. 1 at the time when the number of signals changes. Shown in FIG. 3 are transient gain fluctuations ΔG when the number of signals is reduced from 16 ch to 1 ch while the signal level per channel is set to −20 dBm/ch. For simulating channel count change, two signals at wavelengths λ of 1548.46 nm and 1558.31 nm, respectively, are utilized. Curves shown in FIG. 3 simulate gain fluctuations generated when, while the intensities of light at wavelengths λ of 1548.46 nm and 1558.31 nm are set to those corresponding to 15 ch and 1 ch, respectively, the number of signals is reduced from 16 ch to 1 ch by turning light at a wavelength of 1548.46 nm ON or OFF as signals. The switching generating the gain fluctuations is effected at the point in time indicated by arrow A in the graph.

In FIG. 3, the broken line of curve 310 shows a transient gain fluctuation generated when no gain control is effected, whereas the solid line of curve 320 shows a transient gain fluctuation generated when gain control is effected (by the EDFA 1 shown in FIG. 1). Here, while the transient gain fluctuation in the case without gain control (curve G310) greatly increases to 6.3 dB, the transient gain fluctuation in the case where gain control is carried out by automatic power control of noise light (curve G320) is only about 0.4 dB, whereby the transient gain fluctuation is greatly suppressed.

From the foregoing, it is seen that, in EDFA 1 according to the first embodiment, gain can be made constant at a high accuracy by automatic power control of noise light, and the transient gain fluctuations caused by input channel count change can greatly be suppressed by speeding up the automatic gain control.

While the EDFA 1 of FIG. 1 according to the first embodiment carries out gain control by utilizing the optical circulator 21 and optical filter 22, they can also function as a gain equalizer. Here, functions of the gain equalizer will be explained with reference to FIGS. 4A to 4C and 5. In the following explanation, the optical signals are assumed to be 8 ch of wavelengths $\lambda_1$ to $\lambda_8$.

Figure 4A:
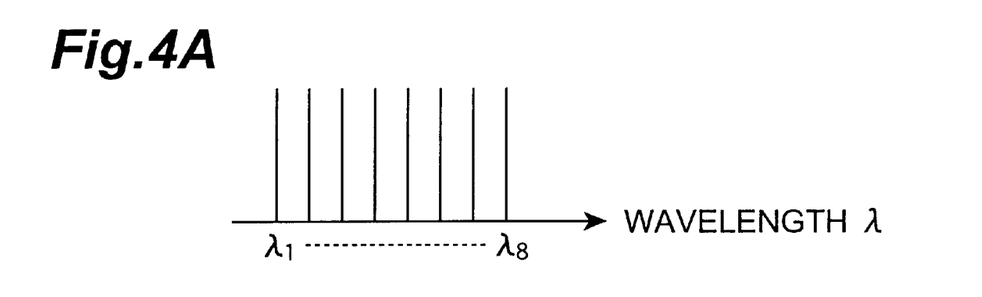
FIGS. 4A to 4C are charts for explaining gain equalization with respect to WDM signals.
Figure 4B:
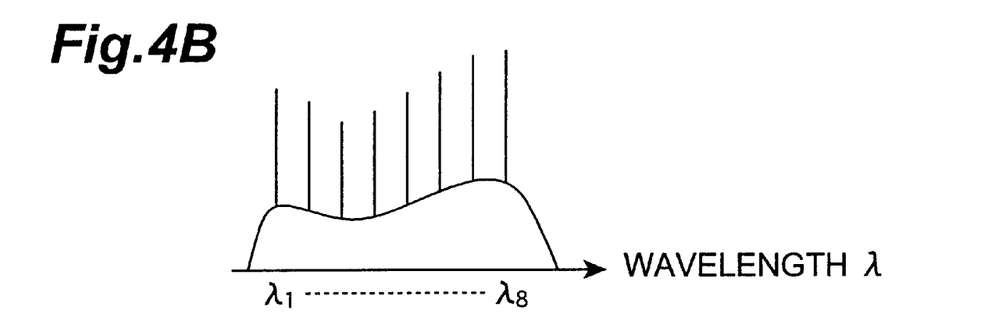

The amplification gain in the EDF 10 has a wavelength dependence. Therefore, even when there are no fluctuations in the input level among individual wavelengths of inputted optical signals as shown in FIG. 4A, the amplified light outputted from the EDF 10 yields level deviations among the individual signal wavelengths as shown in FIG. 4B.

Figure 4C:
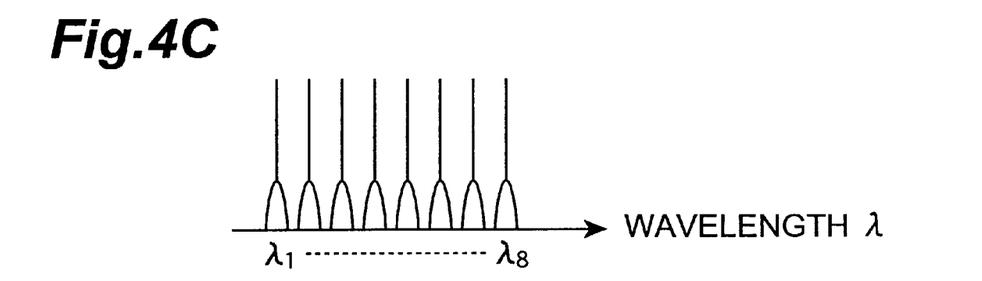
Figure 5:
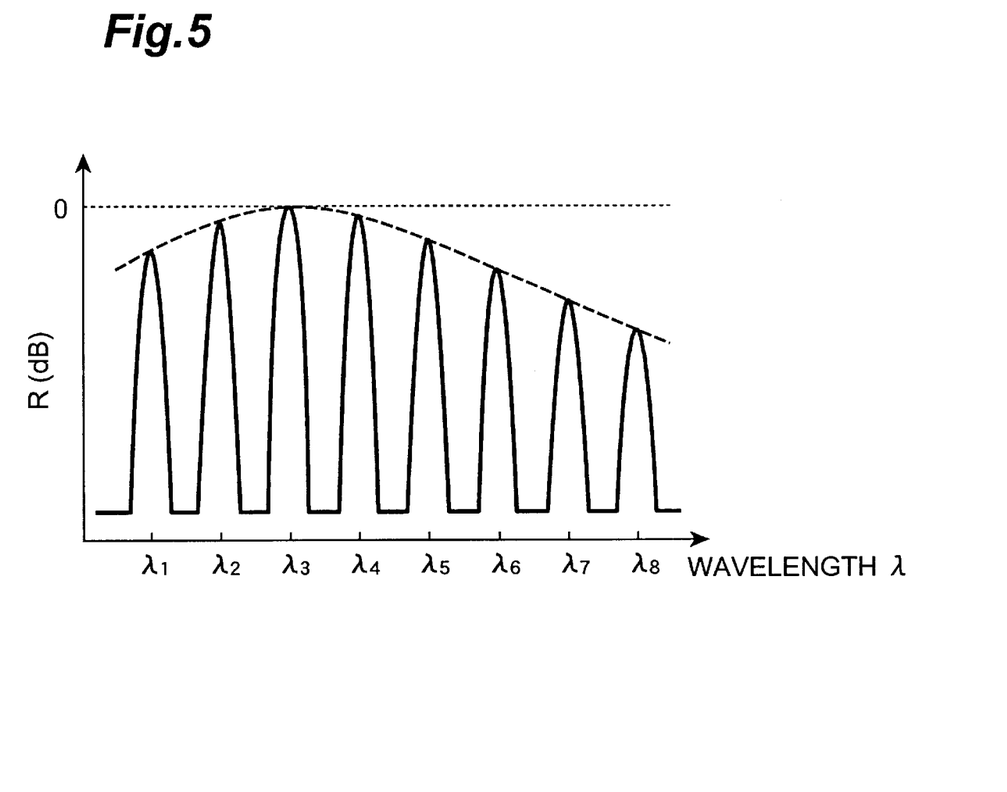
FIG. 5 is a graph showing signal light reflection characteristics of an optical filter which realizes the gain equalization shown in FIGS. 4A to 4C.

If the reflectivity at each signal wavelength in the individual fiber gratings $22_1$ to $22_n$ constituting the optical filter 22 is adjusted, on the other hand, then gain equalization is realized among outputted signals as shown in FIG. 4C. Namely, if the wavelength dependence of reflectivity R of each optical signal in the optical filter 22 is set so as to cancel the wavelength dependence of optical amplification shown in FIG. 5, gain equalization is realized among outputted signals. Here, the reflectivity R (dB) shown in FIG. 5 is a wavelength dependency of reflectivity in the whole optical filter 22 combining the respective reflectivity values in the fiber gratings $22_1$ to $22_8$ corresponding to the respective optical signals at wavelengths of $\lambda_1$ to $\lambda_8$, in which the reflection peak of each wavelength $\lambda_i$ (i=1 to 8) corresponds to the reflectivity in the fiber grating $22_i$.

When the optical filter 22 is provided as such, the EDFA 1 can utilize the optical circulator 21 and optical filter 22 for high-speed automatic gain control, and also can make them function as a gain equalizer.

Figure 6:
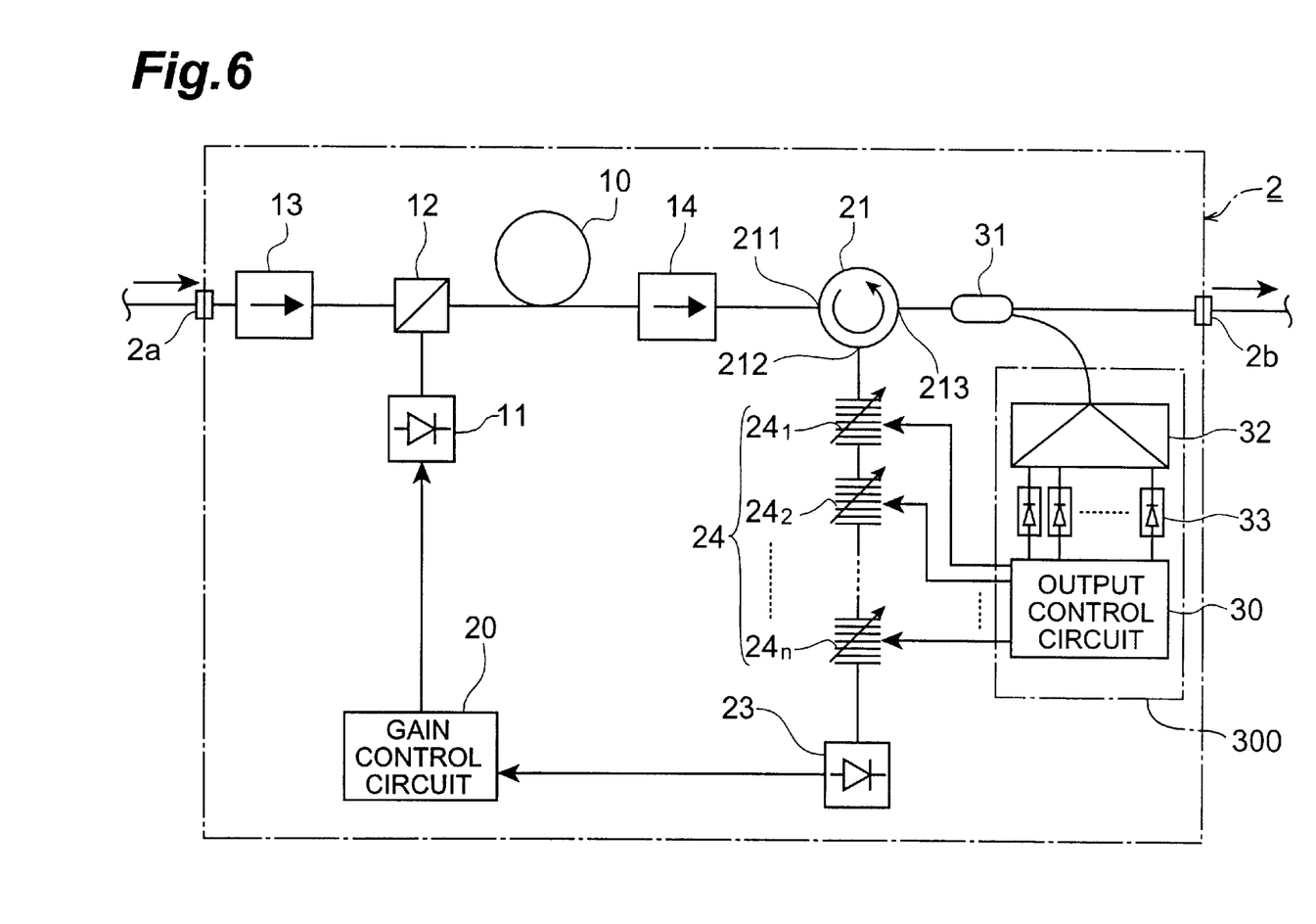
FIG. 6 shows the configuration of an EDFA which is a second embodiment of the optical amplifier according to the present invention.

FIG. 6 is a view showing the configuration of an EDFA which is a second embodiment of the optical amplifier according to the present invention. Though the configuration of the EDFA 2 from its input end 2a to output end 2b comprises a structure similar to that of the EDFA 1 shown in FIG. 1, it differs therefrom mainly in that a variable optical filter 24 including variable fiber gratings $24_1$ to $24_n$ is employed in place of the optical filter 22 including the fiber gratings $22_1$ to $22_n$.

The variable fiber gratings $24_1$ to $24_n$ are similar to the fiber gratings $22_1$ to $22_n$ of FIG. 1 in that they reflect respective optical signals (signal components having wavelengths of $\lambda_1$ to $\lambda_n$) being amplified. However, the variable fiber gratings $24_1$ to $24_n$ are configured such that their corresponding signal wavelengths can alter reflectivity.

For example, in the EDFA 1 shown in FIG. 1, gain equalization is realized by the setting of reflectivity in the optical filter 22, whereas each of the fiber gratings $22_1$ to $22_n$ has a fixed reflectivity, whereby the setting of gain equalization is effected at the time of making the EDFA 1.

In the EDFA 2 according to the second embodiment, by contrast, since the optical filter 24 including the reflectivity-variable fiber gratings $24_1$ to $24_n$ is employed, variable gain equalization control corresponding to the operational state of the EDFA 2 can be carried out. Level adjustment of output signals can also be carried out thereby. Here, gain equalization by use of reflection by fiber gratings is described, for example, in a document, S.-K. Liaw et al., IEEE Photon. Technol. Lett., vol. 11, no. 7, pp.797–799,1999.

As for such reflectivity-variable fiber gratings $24_1$ to $24_n$, for example, a piezoelectric element is used for individually applying distortions to the fiber gratings $24_1$ to $24_n$ by deforming them (expanding/contracting the fiber gratings), thus shifting the peak wavelength of the reflection wavelength distribution for each of the fiber gratings $24_1$ to $24_n$, whereby the reflectivity with respect to each optical signal can be changed.

In this case, chirped fiber gratings are preferably used as the fiber gratings. As compared with normal fiber gratings, changes in reflectivity near a peak wavelength in chirped fiber gratings are milder, and the reflectivity change control by shifting the reflection peak wavelength is easier. When changing the reflectivity by use of a piezoelectric element, a response in about several hundreds of microseconds is possible by the piezoelectric element, whereby variable gain equalization control on the order of several hundreds of microseconds is possible. It may also be configured such that the reflectivity is changed by methods other than those using the piezoelectric element, such as temperature control.

While automatic gain control is carried out by automatic power control utilizing noise light in the EDFA 1 of FIG. 1 and EDFA 2 of FIG. 6 as mentioned above, there are cases where slight gain fluctuations occur due to fluctuations in the input level of optical signals as shown in FIG. 2. This is presumed to be because of the fact that the value of noise figure (NF) upon generating ASE noise light slightly changes depending on the input signal level.

Namely, the power $P_{ASE}(v)$ of ASE noise light is expressed by noise figure NF(v) as $P_{ASE}(v) = NF(v)G(v)$ $hv\Delta v$. Here, $v$ is the signal frequency, G(v) is the gain with respect to the frequency $v$, h is the Planck constant, and $\Delta v$ is the bandwidth of ASE noise light. When the variable optical filter 24 shown in FIG. 6 is employed, influences of such changes in noise light caused by changes in noise figure can also be lowered, whereby the accuracy in automatic gain control can further be improved.

Further, FIG. 6 shows a configurational example of the control system (output control system 300) for the variable optical filter 24. Namely, in the EDFA 2, a part of optical signals outputted by way of the output port 213 of the optical circulator 21 is isolated as monitor light by an optical coupler 31. Thus isolated light is demultiplexed into wavelengths $\lambda_1$ to $\lambda_n$ of signal components by an arrayed waveguide grating 32, whereas level fluctuations of thus demultiplexed signal components are detected by their corresponding n pieces of photodetectors 33.

The respective results of detection of signal components obtained by the photodetectors 33 are supplied to an output control circuit 30, which then adjusts the respective reflectivity values of variable fiber gratings $24_1$ to $24_n$ according to the results of detection such that the output level of each signal component attains a predetermined value. For example, in the case where a piezoelectric element is employed as a distortion-adding structure for applying distortions to the variable fiber gratings $24_1$ to $24_n$, the voltage applied to the piezoelectric element is adjusted so as to set or change reflectivity. Thus, the EDFA 2 according to the second embodiment can realize variable gain equalization, and further can lower the influence of minute gain fluctuations caused by changes in noise figure.

The optical amplifier according to the present invention is not restricted to the above-mentioned embodiments, but can be subjected to various modifications and configurational alterations. For example, as the optical amplifier, optical fibers doped with rare-earth elements such as Pr and Nd instead of Er can be employed. While fiber gratings are employed as the optical filter in each of the above-mentioned embodiments, the fiber gratings can narrow the reflection wavelength band, thus being capable of efficiently reflecting optical signals alone. Optical filters in modes other than the fiber gratings can also be employed without any restriction as long as they are optical members having a similar reflecting function.

Figure 7:
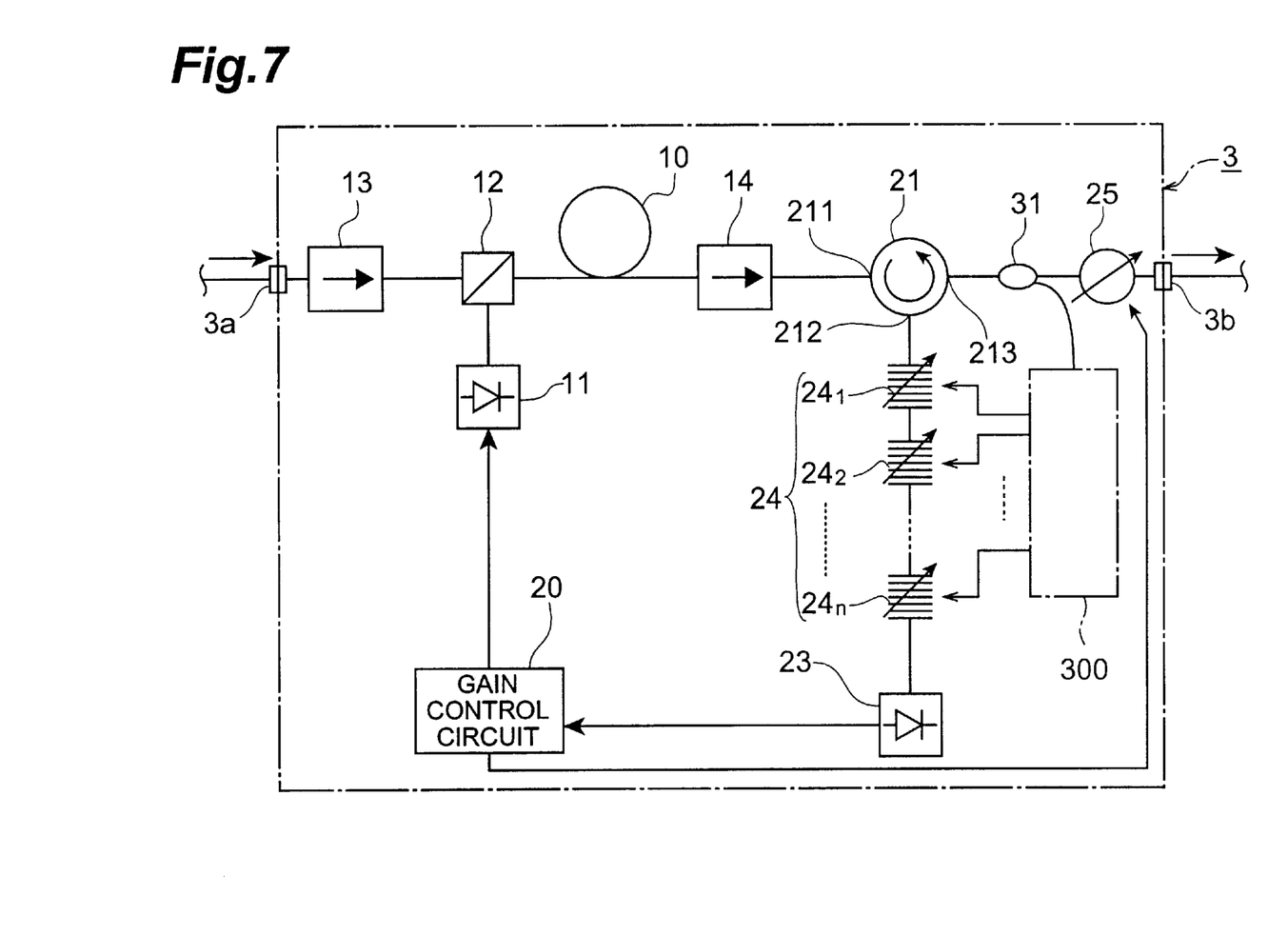
FIG. 7 shows the configuration of an EDFA which is a third embodiment of the optical amplifier according to the present invention.
Figure 8:
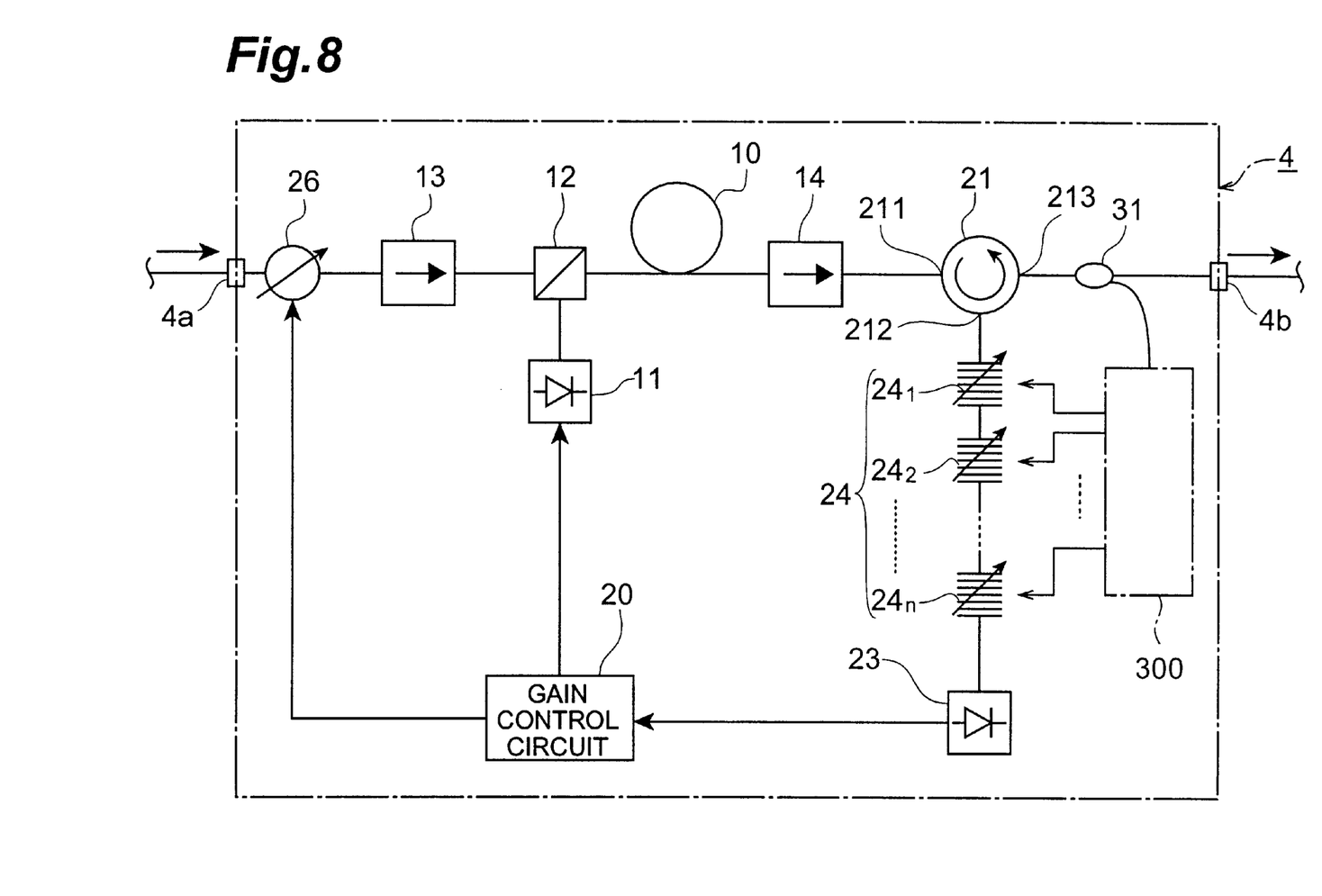
FIG. 8 shows the configuration of an EDFA which is a fourth embodiment of the optical amplifier according to the present invention.

FIG. 7 is a view showing an EDFA 3 which is a third embodiment of the optical amplifier according to the present invention. The configuration of the EDFA 3 from its input end 3a to output end 3b is similar to that in the EDFA 2 (FIG. 6) according to the second embodiment, but is different therefrom in that an output-side variable optical attenuator 25 (first variable optical attenuator) for attenuating optical signals outputted by way of the output port 213 of the optical circulator 21 is disposed between the optical circulator 21 and the output end 3b. FIG. 8 is a view showing an EDFA 4 which is a fourth embodiment of the optical amplifier according to the present invention. The configuration of the EDFA 4 from its input end 4a to output end 4b is different from that of the EDFA 2 according to the second embodiment in that an input-side optical attenuator 26 (second variable optical attenuator) for attenuating optical signals received by way of the input end 4a is disposed between the input end 4a and the EDF 10.

Thus installing a variable optical attenuator on the output side or input side of the EDF 10 enables automatic level control (ALC) which attains a constant gain by adjusting each output level of optical signals and changes the output level if necessary. Further, the output control effected by reflectivity control in the variable optical filter 24, and the output control effected by the output-side variable optical attenuator 25 and input-side optical attenuator 26 can be combined together, so as to carry out various kinds of adjustment and setting. Automatic level control and the like can also be realized when a variable optical attenuator is installed on the output side or input side in the case where the reflectivity-fixed optical filter 22 is used as in the EDFA 1 of FIG. 1.

Figure 9:
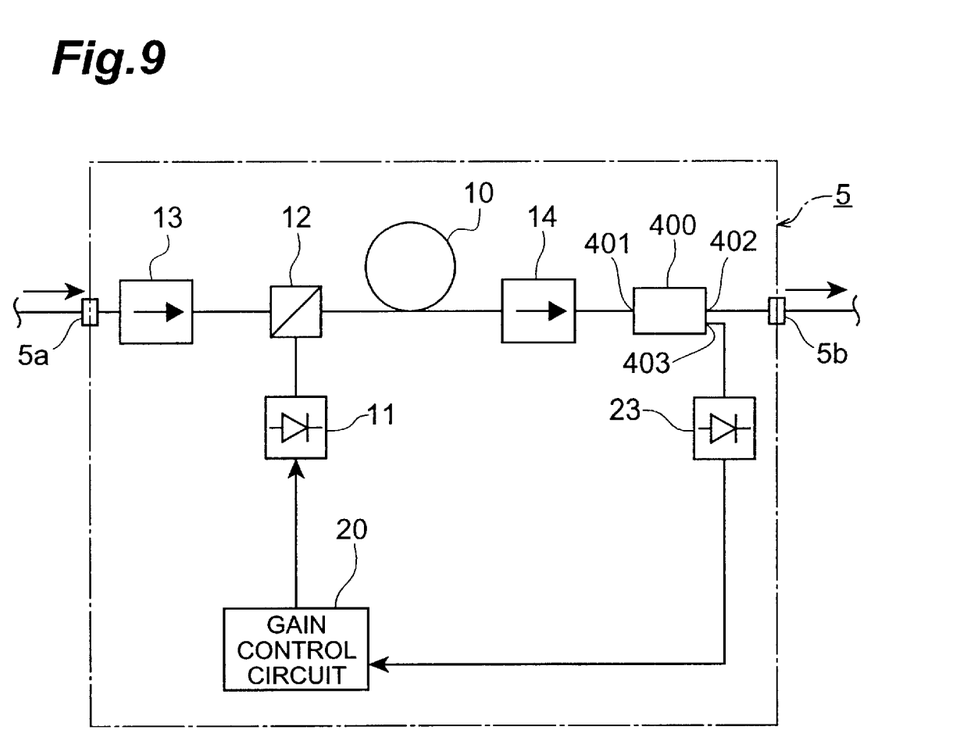
FIG. 9 shows the configuration of an EDFA which is a fifth embodiment of the optical amplifier according to the present invention.

FIG. 9 is a view showing an EDFA 5 which is a fifth embodiment of the optical amplifier according to the present invention. The EDFA 5 according to the fifth embodiment receives optical signals (WDM signals) from a main transmission line by way of an input end 5a, and sends out the amplified optical signals to the main transmission line by way of an output end 5b. However, between the input end 5a and output end 5b, the structure for separating noise light from the amplified light outputted from the EDF 10 differs from the structure of the EDFA 1 according to the first embodiment.

In FIG. 9, the EDFA 5 comprises the input end 5a for receiving the optical signals propagated through the main transmission line and the output end 5b for sending out the amplified light to the main transmission line; and also comprises a structure in which the EDF (Erbium-Doped Optical Fiber) 10, a pumping light source 11, a WDM coupler 12, and two optical isolators 13, 14 are arranged between the input end 5a and output end 5b. The EDF 10, acting as an optical amplification section of the EDFA 5, is a silica-based optical fiber doped with Er element, and functions so as to amplify signal components included in a predetermined amplification wavelength band while in a state where a predetermined wavelength of pumping light is supplied thereto.

Each of the optical isolators 13, 14 is an optical member which passes therethrough inputted light forward but not backward. Namely, the optical isolator 13 passes therethrough toward the EDF 10 the light having arrived there from the input end 5a side but does not send out toward the input end 5a the light having once arrived. Also, the optical isolator 14 passes therethrough toward the output end 5b the light having arrived there from the EDF 10 but does not send out toward the EDF 10 the light having once arrived.

The pumping light supplied to the EDF 10 is emitted from the pumping light source 11. By way of the WDM coupler 12, the pumping light source 11 is connected to an optical fiber line including the EDF 10. Here, the WDM coupler 12 functions to pass therethrough toward the EDF 10 the pumping light outputted from the pumping light source 11 and pass therethrough toward the EDF 10 the optical signals having arrived there from the optical isolator 13. Thus, the EDFA 5 of FIG. 9 according to the fifth embodiment is an optical amplifier having a structure enabling copropagating pumping (forward pumping). As the pumping light source 11 for pumping the EDF 10, a semiconductor laser having a wavelength of 1.48 μm is employable, for example.

If optical signals are fed by way of the optical isolator 13 into the EDF 10 to which a predetermined wavelength of pumping light is supplied from the pumping light source 11 in the configuration mentioned above, then these optical signals are amplified in the EDF 10. Subsequently, amplified light including the amplified optical signals is outputted from the EDF 10 toward the optical isolator 14. At this time, the amplified light outputted from the EDF 10 includes not only the amplified optical signals but also the noise light (forwardly directed ASE noise light) caused by ASE (Amplified Spontaneous Emission).

The EDFA 5 according to the fifth embodiment carries out automatic gain control (AGC) of optical amplification utilizing the ASE noise light included in the amplified light. For realizing the automatic gain control, the EDFA 5 comprises an optical component 400 for separating noise light and optical signals from amplified light, a photodetector 23, and a gain control circuit 20 which is included in a gain control system.

Figure 10A:
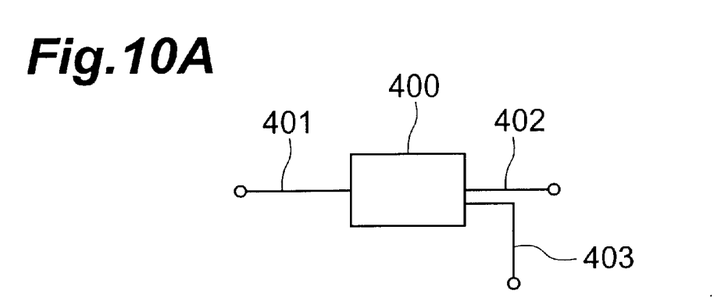
Figure 10B:
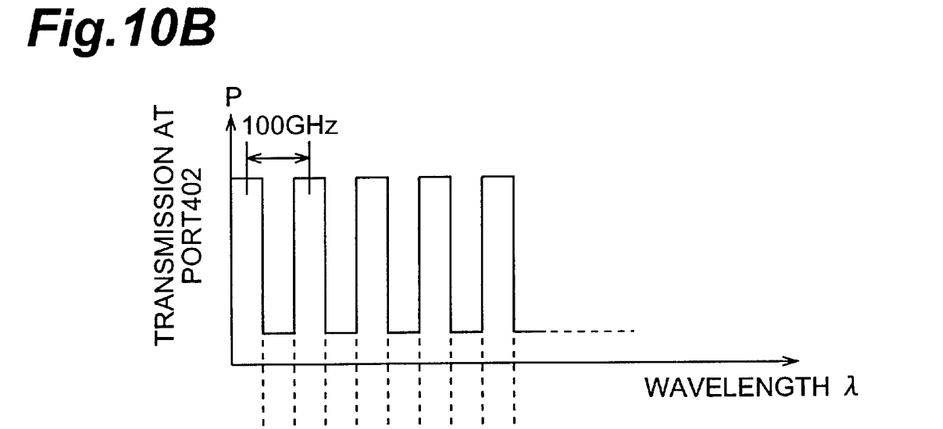
FIGS. 10B and 10C show transmission-spectra of the optical component at the port 402 and 403, respectively.
Figure 10C:
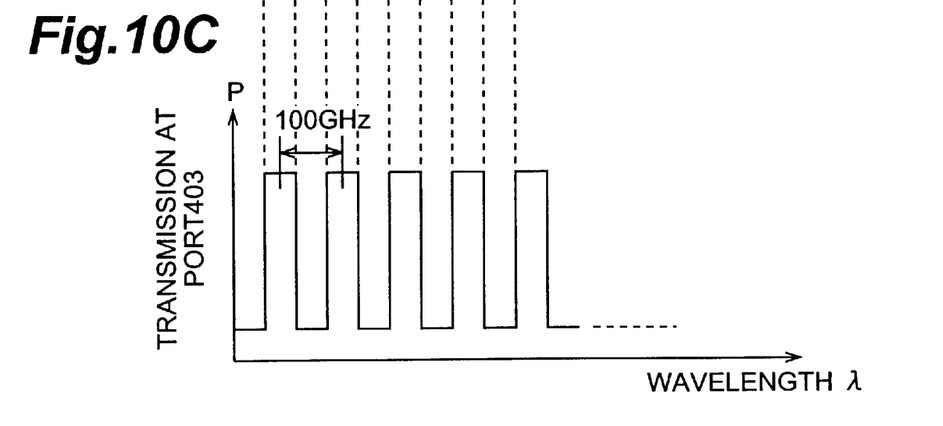

The optical component 400 is an optical component utilized for multiplexing or separating WDM signals in general; and comprises, as shown in FIG. 10A, an input port 401 for receiving optical signals in a predetermined wavelength band, and output ports 402, 403 for taking out two groups into which input optical signals are divided at predetermined frequency intervals. If WDM signals having intervals of 50 GHz are received by way of the input port 401, for example, then the optical element 400 outputs, by way of the output ports 402, 403, two groups of WDM signals each having intervals of 100 GHz as shown in FIGS. 10B and 10C. The optical element 400 not only can divide inputted WDM signals having intervals of 50 GHz into groups of WDM signals having intervals of 100 GHz, but also can multiplex groups of WDM signals having intervals of 100 GHz into WDM signals having intervals of 50 GHz. (One group of WDM signals having intervals of 100 GHz is inputted by way of each of the ports 402, 403, whereas WDM signals having intervals of 50 GHz are outputted by way of the port 401.) Such an optical element 400 is known as interleaver in general, and is noted, for example, in Oguma, et al., "Flattened pass-band filter of double cascaded Mach-Zehnder interferometers," the Institute of Electronics, Information, and Communication Engineers, Electronics Society Conference 1999, C-3-96.

The optical element 400 can be designed not only such that WDM signals having intervals of 50 GHz are divided into two groups of WDM signals having intervals of 100 GHz, but also such that WDM signals having intervals of 100 GHz are divided into two groups of WDM signals each having intervals of 200 GHz or, conversely, such that groups of WDM signals having intervals of 200 GHz are multiplexed into WDM signals having intervals of 100 GHz.

Figure 11A:
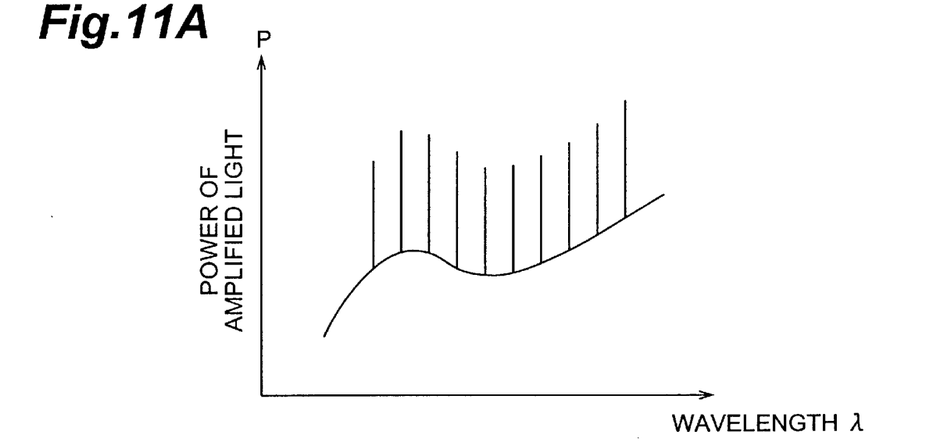
Figure 11B:
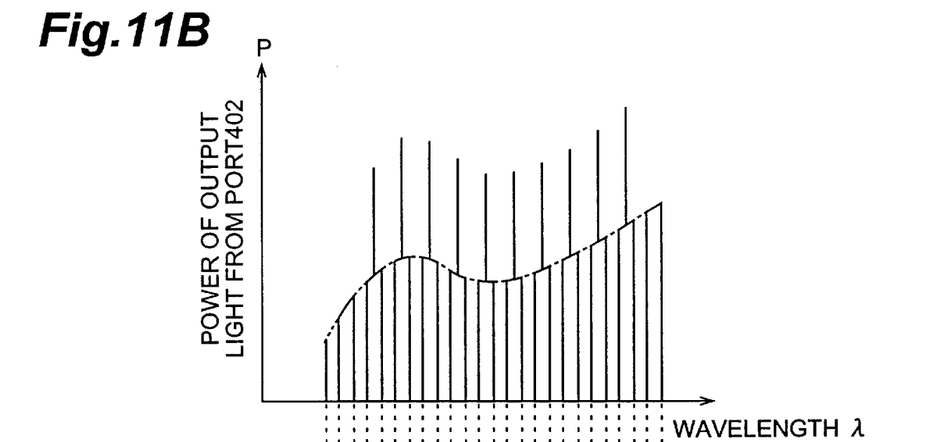
FIGS. 11B and 11C show output spectra at the port 402 and 403, respectively.
Figure 11C:
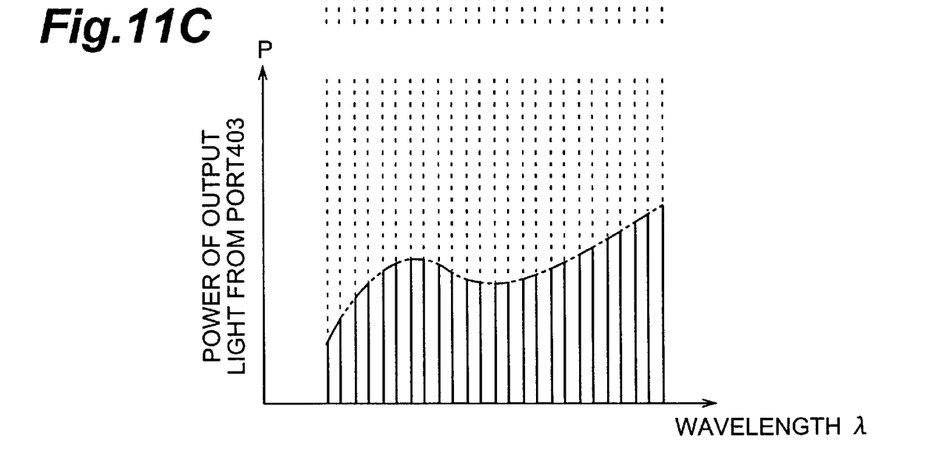

If amplified light (including ASE noise light together with optical signals) having the spectrum shown in FIG. 11A is outputted from the EDF 10 in the EDFA 5 (fifth embodiment) of FIG. 9, then this amplified light is received by the optical element 400 byway of the input port 401. The optical element 400 is designed such that thus received amplified light is divided into two so as to yield light in a wavelength band including signal components and light in a wavelength band including only noise components. Namely, the frequency interval for dividing the signal wavelength band is substantially set at ½ of the frequency interval of the optical signals inputted to the EDF 10. As a consequence, while light having a spectrum such as one shown in FIG. 11B including signal components is outputted by way of the output port 401, light having the spectrum shown in FIG. 11C including only noise components is outputted by way of the output port 403.

Further, the noise light separated from the optical element 400 is detected by the photodetector 23 (photodetector device) such as PD. The photodetector 23 is electrically connected to the gain control circuit 20, whereby the result of detection of noise light level obtained by the photodetector 23 is supplied to the gain control circuit 20.

As long as the amplification gain in the EDF 10 is constant, the power of the ASE noise light outputted from the EDF 10 hardly varies even when the signal level (input level) of optical signals is changed. With respect to noise light having such a property, the gain control circuit 20 (included in the gain control system) carries out power control of the pumping light supplied from the pumping light source 11 to the EDF 10, such that the power of noise light detected by the photodetector 23 becomes substantially constant. As a consequence, the automatic gain control in the EDFA 5 is realized.

While automatic power control (APC) for only the power of noise light is actually performed in the gain control circuit 20, effects of automatic gain control can be obtained from the above-mentioned relationship between noise light power and amplification gain. Therefore, the method of automatic gain control, specifically, the circuit configuration of the gain control circuit 20 or the like, can be simplified, and the automatic gain control for constantly maintaining the amplification gain can be accelerated. Also, since it is sufficient for the photodetector 23 to measure the power of the whole noise light alone, this configuration can easily respond to optical amplifiers having a wide dynamic range. Further, in the EDFA 5 according to the fifth embodiment, the power proportion of the noise light utilized for automatic power control is made greater, whereby a higher speed is realized in the automatic gain control.

Thus, the optical element 400 adapted to divide a band component including optical signals into two at appropriate frequency intervals is employed in the EDFA 5 according to the fifth embodiment. As a consequence, if the dividing frequency intervals are set appropriately, then noise light having a sufficient power and optical signals are separated with a high accuracy from the amplified light, whereby the pumping efficiency of EDF 10 can be improved, and the noise property of output light eventually sent out onto the main transmission line by way of the output end 5b of the EDFA 5 is greatly improved.

As in the foregoing, the present invention is configured such that separation of ASE noise light included in amplified light is carried out not on the main transmission line through which optical signals are to propagate, but on a branch line by use of an optical circulator or by utilizing a highly accurate light-separating element such as interleaver, so as to utilize most of noise light as monitor light for automatic gain control of EDF, whereby the efficiency in measurement of noise light power can be improved, and the transmission quality can effectively be prevented from lowering. Further, this configuration makes it possible to detect changes in gain of EDF with a higher speed and higher accuracy, whereby gain can be made constant with a higher speed and higher accuracy by automatic gain control.

Also, employing such an optical amplifier in a WDM transmission system makes it possible to realize a transmission system in which the signal level of each signal wavelength is flattened with a sufficient accuracy even when high-speed, large-capacity signal switching is effected by OXC, OADM, or the like.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. An optical amplifier comprising:
   an optical amplification section for amplifying optical signals inputted together with pumping light;
   a pumping light source for supplying said pumping light to said optical amplification section;
   an optical circulator having a first port for inputting amplified light from said optical amplification section which includes noise light and amplified optical signals, a second port for outputting the amplified light from said first port, and a third port for outputting a part of said amplified light re-inputted by way of said second port;
   an optical filter for passing therethrough said noise light in said amplified light outputted by way of said second port of said optical circulator, and reflecting said amplified optical signals in said amplified light such that said amplified optical signals are re-inputted to said optical circulator by way of said second port;
   a photodetector device for detecting a total power of said noise light having passed through said optical filter; and
   a gain control system for controlling an amplification gain in said optical amplification section by controlling said pumping light source so as to keep the total power of said noise light detected by said photodetector device at a constant level.

2. An optical amplifier according to claim 1, wherein reflectivity in said optical filter is set for each wavelength of said amplified optical signals so as to equalize a wavelength dependence of amplification gain in said optical amplification section.

3. An optical amplifier according to claim 1, further comprising:
   a first variable optical attenuator for attenuating said optical signals outputted from said third port of said optical circulator.

4. An optical amplifier according to claim 1, further comprising:
   a second variable optical attenuator for attenuating said optical signals to be inputted to said optical amplification section.

5. An optical amplifier according to claim 1, wherein said optical filter includes fiber Bragg gratings each passing therethrough said noise light in said amplified light but reflecting the associated one of said amplified optical signals in said amplified light.

6. An optical amplifier according to claim 1, further comprising:
   an output control system for controlling an output level of each optical signal outputted from said third port of said optical circulator by regulating reflectivity in said optical filter for each wavelength of said amplified optical signals.

7. An optical amplifier according to claim 5, wherein said optical filter includes fiber Bragg gratings each passing therethrough said noise light in said amplified light but reflecting the associated one of said amplified optical signals in said amplified light, and
   wherein said output control system comprises a structure for applying a temperature change or a distortion accompanying deformation to said fiber gratings in order to change each reflectivity of said fiber gratings for each wavelength of said amplified optical signals.

8. An optical amplifier comprising:

an optical amplification section for amplifying optical signals inputted together with pumping light;

a pumping light source for supplying said pumping light to said optical amplification section;

an optical element for dividing a signal wavelength band into local bands at a predetermined frequency interval, and separating the divided local bands into a group including said optical signals and a group including said noise light, said optical element having a first port for inputting amplified light from said optical amplification section including noise light and amplified optical signals, a second port for outputting said amplified optical signals separated from the amplified light inputted by way of said first port, and a third port for outputting the noise light separated from said amplified light inputted by way of said first port;

a photodetector device for detection a total power of said noise light outputted by way of said third port; and a gain control system for controlling an amplification gain in said optical amplification section by controlling said pumping light source so as to keep the total power of said noise light detected by said photodetector device at a constant level.

9. An optical amplifier according to claim 8, wherein the frequency interval for dividing the signal wavelength band is substantially ½ of the frequency interval of said optical signals inputted to said optical amplification section.

\* \* \* \* \*